(12) United States Patent
Candelore et al.

(10) Patent No.: US 7,155,012 B2
(45) Date of Patent: *Dec. 26, 2006

(54) SLICE MASK AND MOAT PATTERN PARTIAL ENCRYPTION

(75) Inventors: Brant L. Candelore, Escondido, CA (US); Henry Derovanessian, San Diego, CA (US); Leo M. Pedlow, Jr., Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 799 days.

This patent is subject to a terminal disclaimer.

(21) Appl. No.: 10/274,084

(22) Filed: Oct. 18, 2002

(65) Prior Publication Data

US 2003/0152226 A1    Aug. 14, 2003

Related U.S. Application Data

(63) Continuation-in-part of application No. 10/038,217, filed on Jan. 2, 2002, and a continuation-in-part of application No. 10/038,032, filed on Jan. 2, 2002, and a continuation-in-part of application No. 10/037,914, filed on Jan. 2, 2002, and a continuation-in-part of application No. 10/037,499, filed on Jan. 2, 2002, and a continuation-in-part of application No. 10/037,498, filed on Jan. 2, 2002.

(60) Provisional application No. 60/409,675, filed on Sep. 9, 2002, provisional application No. 60/372,855, filed on Apr. 16, 2002.

(51) Int. Cl.
*H04N 7/176* (2006.01)

(52) U.S. Cl. .................. 380/214; 380/210; 713/160; 713/189

(58) Field of Classification Search ................ 380/210, 380/214; 713/160, 189
See application file for complete search history.

(56) References Cited

U.S. PATENT DOCUMENTS 3,852,519 A    12/1974    Court
(Continued)

FOREIGN PATENT DOCUMENTS

EP            0471373        2/1992
(Continued)

OTHER PUBLICATIONS

Alattar et al; "Improved Selective Encryption Techniques for Secure Transmission of MPEG Video Bit-Streams"; 1999; IEEE; pp. 256-260.*

(Continued)

*Primary Examiner*—Gilberto Barron, Jr.
*Assistant Examiner*—Jung Kim
(74) *Attorney, Agent, or Firm*—Miller Patent Services; Jerry A. Miller

(57) ABSTRACT

A selective encryption encoder consistent with certain embodiments of the invention has vertical and/or horizontal stripes encrypted. In one embodiment, packets are examined in the digital video signal to identify a specified packet type, the specified packet type being both packets carrying intra-coded data representing a pattern of horizontal stripes across an image and packets carrying intra-coded data representing a pattern of vertical stripes across an image. The packets identified as being of the specified packet type are encrypted using a first encryption method to produce first encrypted packets. These first encrypted packets are then used to replace the unencrypted packets in the digital video signal to produce a partially encrypted video signal. The packets of the specified type can also be multiple encrypted and replaced in the data stream to produce a multiple encrypted video data stream.

26 Claims, 12 Drawing Sheets

U.S. PATENT DOCUMENTS

| | | |
|---|---|---|
| 4,381,481 A | 4/1983 | Kuppers et al. |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kono |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,924,310 A | 5/1990 | von Brandt |
| 4,944,006 A | 7/1990 | Citta et al. |
| 4,953,023 A | 8/1990 | Kondo |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson et al. |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A * | 6/1994 | Finkelstein et al. ........... 380/44 |
| 5,325,432 A | 6/1994 | Gardeck et al. |
| 5,327,502 A | 7/1994 | Katata et al. |
| 5,341,425 A | 8/1994 | Wasilewski et al. |
| 5,359,694 A | 10/1994 | Concordel |
| 5,379,072 A | 1/1995 | Kondo |
| 5,398,078 A | 3/1995 | Masuda et al. |
| 5,400,401 A | 3/1995 | Wasilewski et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,518,934 A | 5/1996 | Forrest et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Dillon et al. |
| 5,663,764 A | 9/1997 | Kondo et al. |
| 5,666,293 A | 9/1997 | Metz et al. |
| 5,699,429 A | 12/1997 | Tamer et al. |
| 5,703,889 A | 12/1997 | Shimoda et al. |
| 5,717,814 A | 2/1998 | Abecassis |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachetti et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A * | 5/1998 | Aucsmith .................... 380/28 |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasilewski et al. |
| 5,894,320 A | 4/1999 | Vancelette |
| 5,894,516 A | 4/1999 | Brandenburg |
| 5,915,018 A | 6/1999 | Aucsmith |
| 5,922,048 A | 7/1999 | Emura |
| 5,923,755 A | 7/1999 | Birch |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,973,679 A | 10/1999 | Abbott et al. |
| 5,973,722 A | 10/1999 | Wakai et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,021,199 A | 2/2000 | Ishibashi |
| 6,021,201 A | 2/2000 | Bakhle et al. |
| 6,026,164 A | 2/2000 | Sakamoto et al. |
| 6,028,932 A | 2/2000 | Park |
| 6,049,613 A | 4/2000 | Jakobsson |
| 6,055,314 A | 4/2000 | Spies et al. |
| 6,055,315 A | 4/2000 | Doyle et al. |
| 6,057,872 A | 5/2000 | Candelore |
| 6,058,186 A | 5/2000 | Enari |

| | | | | | | |
|---|---|---|---|---|---|---|
| 6,058,192 | A | 5/2000 | Guralnick et al. | 6,678,740 B1 | 1/2004 | Rakib et al. |
| 6,061,451 | A | 5/2000 | Muratani et al. | 6,681,326 B1 | 1/2004 | Son et al. |
| 6,064,748 | A | 5/2000 | Hogan | 6,684,250 B1 | 1/2004 | Anderson et al. |
| 6,065,050 | A | 5/2000 | DeMoney | 6,697,944 B1 | 2/2004 | Jones et al. |
| 6,069,647 | A | 5/2000 | Sullivan et al. | 6,754,276 B1 | 6/2004 | Harumoto et al. |
| 6,070,245 | A | 5/2000 | Murphy, Jr. et al. | 6,772,340 B1 | 8/2004 | Peinado et al. |
| 6,072,872 | A | 6/2000 | Chang et al. | 6,788,690 B1 | 9/2004 | Harri |
| 6,072,873 | A | 6/2000 | Bewick | 6,826,185 B1 | 11/2004 | Montanaro et al. |
| 6,073,122 | A | 6/2000 | Wool | 6,891,565 B1 | 5/2005 | Dieterich |
| 6,088,450 | A | 7/2000 | Davis et al. | 6,904,520 B1 | 6/2005 | Rosset et al. |
| 6,105,134 | A | 8/2000 | Pinder et al. | 6,976,166 B1 * | 12/2005 | Herley et al. ................ 713/165 |
| 6,108,422 | A | 8/2000 | Newby et al. | 2001/0030959 A1 | 10/2001 | Ozawa et al. |
| 6,115,821 | A | 9/2000 | Newby et al. | 2002/0026587 A1 | 2/2002 | Talstra et al. |
| 6,118,873 | A | 9/2000 | Lotspiech et al. | 2002/0046406 A1 | 4/2002 | Chelehmai et al. |
| 6,134,551 | A | 10/2000 | Aucsmith | 2002/0047915 A1 | 4/2002 | Misu |
| 6,138,237 | A | 10/2000 | Ruben et al. | 2002/0059425 A1 | 5/2002 | Belfiore et al. |
| 6,148,082 | A * | 11/2000 | Slattery et al. ............. 380/212 | 2002/0083317 A1* | 6/2002 | Ohta et al. ................... 713/161 |
| 6,154,206 | A | 11/2000 | Ludtke | 2002/0083438 A1 | 6/2002 | So et al. |
| 6,157,719 | A | 12/2000 | Wasilewski et al. | 2002/0097322 A1 | 7/2002 | Monroe et al. |
| 6,181,334 | B1 | 1/2001 | Freeman et al. | 2002/0108035 A1 | 8/2002 | Herley et al. |
| 6,185,369 | B1 | 2/2001 | Ko et al. | 2002/0129243 A1 | 9/2002 | Nanjundiah |
| 6,185,546 | B1 | 2/2001 | Davis | 2002/0150239 A1 | 10/2002 | Carny et al. |
| 6,189,096 | B1 | 2/2001 | Haverty | 2002/0170053 A1 | 11/2002 | Peterka et al. |
| 6,192,131 | B1 | 2/2001 | Geer, Jr. et al. | 2002/0184506 A1 | 12/2002 | Perlman |
| 6,199,053 | B1 | 3/2001 | Herbert et al. | 2002/0194613 A1 | 12/2002 | Unger |
| 6,204,843 | B1 | 3/2001 | Freeman et al. | 2002/0196939 A1 | 12/2002 | Unger et al. |
| 6,209,098 | B1 | 3/2001 | Davis | 2003/0002854 A1 | 1/2003 | Belknap et al. |
| 6,215,484 | B1 | 4/2001 | Freeman et al. | 2003/0009669 A1 | 1/2003 | White et al. |
| 6,226,618 | B1 | 5/2001 | Downs et al. | 2003/0021412 A1 | 1/2003 | Candelore et al. |
| 6,229,895 | B1 | 5/2001 | Son et al. | 2003/0026423 A1 | 2/2003 | Unger et al. |
| 6,230,194 | B1 | 5/2001 | Frailong et al. | 2003/0046686 A1 | 3/2003 | Candelore et al. |
| 6,230,266 | B1 | 5/2001 | Perlman et al. | 2003/0063615 A1 | 4/2003 | Luoma et al. |
| 6,236,727 | B1 | 5/2001 | Ciacelli et al. | 2003/0072555 A1 | 4/2003 | Yap et al. |
| 6,240,553 | B1 | 5/2001 | Son et al. | 2003/0077071 A1 | 4/2003 | Lin et al. |
| 6,246,720 | B1 | 6/2001 | Kutner et al. | 2003/0081630 A1 | 5/2003 | Mowery et al. |
| 6,256,747 | B1 | 7/2001 | Inohara et al. | 2003/0081776 A1 | 5/2003 | Candelore |
| 6,263,506 | B1 | 7/2001 | Ezaki et al. | 2003/0084284 A1 | 5/2003 | Ando et al. |
| 6,266,416 | B1 | 7/2001 | Sigbj.o slashed.rnsen et al. | 2003/0097662 A1 | 5/2003 | Russ et al. |
| 6,266,480 | B1 | 7/2001 | Ezaki et al. | 2003/0112333 A1 | 6/2003 | Chen et al. |
| 6,272,538 | B1 | 8/2001 | Holden et al. | 2003/0118243 A1 | 6/2003 | Sezer et al. |
| 6,278,783 | B1 | 8/2001 | Kocher et al. | 2003/0123664 A1 | 7/2003 | Pedlow et al. |
| 6,289,455 | B1 | 9/2001 | Kocher et al. | 2003/0123849 A1 | 7/2003 | Nallur et al. |
| 6,292,568 | B1 | 9/2001 | Akins, III et al. | 2003/0126086 A1 | 7/2003 | Safadi |
| 6,292,892 | B1 | 9/2001 | Davis | 2003/0133570 A1 | 7/2003 | Candelore et al. |
| 6,307,939 | B1 | 10/2001 | Vigarie | 2003/0140257 A1 | 7/2003 | Peterka et al. |
| 6,311,012 | B1 | 10/2001 | Cho et al. | 2003/0145329 A1 | 7/2003 | Candelore |
| 6,324,288 | B1 | 11/2001 | Hoffman | 2003/0152224 A1 | 8/2003 | Candelore et al. |
| 6,351,538 | B1 | 2/2002 | Uz | 2003/0152226 A1 | 8/2003 | Candelore et al. |
| 6,378,130 | B1 | 4/2002 | Adams | 2003/0156718 A1 | 8/2003 | Candelore et al. |
| 6,389,533 | B1 | 5/2002 | Davis et al. | 2003/0159139 A1 | 8/2003 | Candelore et al. |
| 6,389,537 | B1 | 5/2002 | Davis et al. | 2003/0159140 A1 | 8/2003 | Candelore et al. |
| 6,415,031 | B1 | 7/2002 | Colligan et al. | 2003/0159152 A1 | 8/2003 | Lin et al. |
| 6,415,101 | B1 | 7/2002 | deCarmo et al. | 2003/0174837 A1 | 9/2003 | Candelore et al. |
| 6,430,361 | B1 | 8/2002 | Lee | 2003/0188154 A1 | 10/2003 | Dallard |
| 6,445,738 | B1 | 9/2002 | Zdepski et al. | 2003/0193973 A1 | 10/2003 | Takashimizu et al. |
| 6,449,718 | B1 | 9/2002 | Rucklidge et al. | 2003/0198223 A1 | 10/2003 | Mack et al. |
| 6,453,115 | B1 | 9/2002 | Boyle | 2003/0204717 A1 | 10/2003 | Kuehnel |
| 6,456,985 | B1 | 9/2002 | Ohtsuka | 2003/0226149 A1 | 12/2003 | Chun et al. |
| 6,459,427 | B1 | 10/2002 | Mao et al. | 2003/0228018 A1 | 12/2003 | Vince |
| 6,463,152 | B1 | 10/2002 | Takahashi | 2004/0003008 A1 | 1/2004 | Wasilewski et al. |
| 6,466,671 | B1 | 10/2002 | Maillard et al. | 2004/0010717 A1 | 1/2004 | Simec et al. |
| 6,505,032 | B1 | 1/2003 | McCorkle et al. | 2004/0028227 A1 | 2/2004 | Yu |
| 6,505,299 | B1 | 1/2003 | Zeng et al. | 2004/0047470 A1 | 3/2004 | Candelore |
| 6,510,554 | B1 | 1/2003 | Gordon et al. | 2004/0049688 A1 | 3/2004 | Candelore et al. |
| 6,519,693 | B1 | 2/2003 | Debey | 2004/0049690 A1 | 3/2004 | Candelore et al. |
| 6,529,526 | B1 | 3/2003 | Schneidewend | 2004/0049691 A1 | 3/2004 | Candelore et al. |
| 6,543,053 | B1 | 4/2003 | Li et al. | 2004/0049694 A1 | 3/2004 | Candelore |
| 6,549,229 | B1 | 4/2003 | Kirby et al. | 2004/0078575 A1 | 4/2004 | Morten et al. |
| 6,557,031 | B1 | 4/2003 | Mimura et al. | 2004/0081333 A1 | 4/2004 | Grab et al. |
| 6,587,561 | B1 | 7/2003 | Sered et al. | 2004/0091109 A1 | 5/2004 | Son et al. |
| 6,640,145 | B1 | 10/2003 | Hoffberg et al. | 2004/0123094 A1 | 6/2004 | Sprunk |
| 6,650,754 | B1 | 11/2003 | Akiyama et al. | 2004/0139337 A1 | 7/2004 | Pinder et al. |
| 6,654,389 | B1 | 11/2003 | Brunheroto et al. | 2004/0165586 A1 | 8/2004 | Read et al. |

| | | |
|---|---|---|
| 2004/0187161 A1 | 9/2004 | Cao |
| 2004/0193550 A1 | 9/2004 | Siegal |
| 2005/0004875 A1 | 1/2005 | Kontio et al. |
| 2005/0071669 A1 | 3/2005 | Medvinsky et al. |
| 2005/0169473 A1 | 8/2005 | Candelore |
| 2005/0192904 A1 | 9/2005 | Candelore |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 06802090 | 4/1995 |
| EP | 0674440 | 9/1995 |
| EP | 0674441 | 9/1995 |
| EP | 0674441 A1 * | 9/1995 |
| EP | 0833517 | 4/1998 |
| EP | 0866615 | 9/1998 |
| EP | 1 187 483 A2 | 3/2002 |
| EP | 1187483 | 3/2002 |
| JP | 067028 | 3/1995 |
| JP | 11243534 | 10/2002 |
| WO | WO 86/07224 | 12/1986 |
| WO | WO 94/10775 | 5/1994 |
| WO | WO 97/38530 | 10/1997 |
| WO | WO 00/31964 | 6/2000 |
| WO | WO 01/65762 | 9/2001 |
| WO | WO 01/78386 | 10/2001 |
| WO | WO 01/78386 A2 | 10/2001 |

OTHER PUBLICATIONS

Liu, et al. Motion Vector Encryption in Multimedia Streaming, 2004, IEEE, pp. 64-71.
Alattar, A.M. et al., Improved selective encryption techniques for secure transmission of MPEG video bitstreams, Oct. 24, 1999, Digimarc Corp., Lake Oswego, OR, USA, IEEE, pp. 256-260.
Kunkelmann T. et al., A scalable security architecture for multimedia communication standards, Darmstard Univ. of Technology, ITO, Germany, 1997, pp. 660-661.
Yip, Kun-Wah, Partial-encryption technique for intellectual property protection of FPGA-Based products, Dec. 15, 1999, IEEE, pp. 183-190.
International Search Report for application No. PCT/US2004/032228.
"A Report on Security Issues in Multimedia" by Gulwani, pp. 10-14, Apr. 30, 2000, Course Notes, Department of Computer Science and Engineering, Indian Institute of Technology Kanpur.
"Ad Agencies and Advertisers To Be Empowered with Targeted Ads Delivered by Television's Prevailing Video Servers" Article Business Section of The New York Times, Updated Thursday, Dec. 20, 2001.
"An Efficient MPEG Video Encryption Algorithm" by Shi and Bhargava, pp. 381-386, 1998 IEEE.
"An Empirical Study of Secure MPEG Video Transmissions" by Agi and Gong, pp. 137-144, 1996, IEEE, Proceedings of SNDSS '96.
"Applying Encryption to Video Communication" by Kunkelmann, pp. 41-47, Sep. 1998, Multimedia and Security Workshop at ACM Multimedia '98, Bristol, U.K.
"Comparison of MPEG Encryption Algorithms" by Qiao and Nahrstedt, Jan. 17, 1998, Preprint submitted to Elsevier Science.
"Coral Consortium Aims to Make DRM Interoperable", by Bill Rosenblatt, Oct. 7, 2004, online at http://www.drmwatch.com/standards/article.php/3418741.
"DVD Demystified—The Guidebook for DVD-Video and DVD-ROM" by Jim Taylor, Pub. McGraw-Hill, 1998, ISBN: 0-07-064841-7, pp. 134-147.
"Dynamic-Customized TV Advertising Creation and Production Tools" by SeaChange International, Web Site Literature.
"Efficient Frequency Domain Video Scrambling for Content Access Control" by Zeng and Lei, Nov. 1999, In Proc. ACM Multimedia.
"Evaluation of Selective Encryption Techniques for Secure Transmission of MPEG-Compressed Bit-Streams" by Alattar and Al-Regib, pp. IV-340 to IV-343, 1999, IEEE.
"Fast Encryption Methods for Audiovisual Data Confidentiality" by Wu and Kuo, Nov. 2000, SPIE International Symposia on Information Technologies 2000, (Boston, MA., USA).
"Improved Selective Encryption Techniques for Secure Transmission of MPEG Video Bit-Streams" by Alattar, Al-Regib and Al-Semari, pp. 256-260, 1999, IEEE.
Metro Media ™ PVR-DVD-MP3-Web—Internet publication from www.metrolink.com, undated.
"Multimedia and Security Workshop at ACM Multimedia" '98. Bristol. U.K., Sep. 1998.
"Passage ™, Freedom to Choose", 2003, Sony Electronics Inc.
"Performance Study of a Selective Encryption Scheme for the Security of Networked, Real-Time Video" by Spanos and Maples, pp. 2-10, 1995, IEEE.
"Pre-Encryption Profiles—Concept Overview and Proposal", Rev. 1.2 as submitted to the Open CAS consortium on Dec. 28, 2000.
"Run-Time Performance Evaluation for a Secure MPEG System Supporting Both Selective Watermarking and Encryption" by Wu and Wu, Mar. 1, 1997, submitted to JSAC special issue on Copyright and Privacy Protection.
"Selective Encryption and Watermarking of MPEG Video (Extended Abstract)" by Wu and Wu, Feb. 17, 1997, submitted to International Conference on Image Science, Systems, and Technology, CISST'97.
"The Long March to Interoperable Digital Rights Management" by Koenen et al., pp. 1-17, 2004, IEEE.
"Transport Streams Insertion of Video in the Compressed Digital Domain" by SeaChange International, Web Site Literature, 2000.
"Visible World—A High Impact Approach to Customized Television Advertising" by Haberman, Dec. 2001.
ANONYMOUS, Message Authentication with Partial Encryption, Research dicosure RD 296086, Dec. 10, 1998.
McCormac Hack Over Cablemodem, HackWatch, Aug. 10, 1998.
ANONYMOUS, New Digital Copy Protection Proposal Would Secure Authorized Copies, PR Newswire, Nov. 1998, pp. 1-3.
Aravind, H. , et al., "Image and Video Coding Standards", AT&T Technical Journal, (Jan./Feb. 1993),67-68.
Gonzalez, R.C., et al., "Digital Image Processing", Addison Wesley Publishing Company, Inc., (1992),346-348.
Kim, et al., "Bit Rate Reduction Algorithm for a Digital VCR", IEEE Transactions on Consumer Electronics, vol. 37, No. 3, (Aug. 1, 1992),267-274.
Kondo, et al., "A New Concealment Method for Digital VCRs", IEEE Visual Signal Processing and Communication, Melbourne, Australia,(Sep. 1993),20-22.
Kondo, et al., "Adaptive Dynamic Range Coding Scheme for Future Consumer Digital VTR", 219-226.
Kondo, et al., "Adaptive Dynamic Range Coding Scheme for Future HDTV Digital VTR", Sony Corporation, (1991).
Lakshiminath, et al., "A Dual Protocol for Scalable Secure Multicasting", 1999 International Symposium on Computers and Communication, Jul. 6-8, 1999.
Lookabaugh et al., "Selective Encryption and MPEG-2", ACM Multimedia '03, Nov. 2003.
Menezes, Alfred J., et al., "Handbook of Applied Cryptography", CRC Press, 551-553.
NHK Laboratories Note, "Error Correction, Concealment and Shuffling", No. 424, (Mar. 1994),29-44.
Park, et al., "A Simple Concealment for ATM Bursty Cell Loss", IEEE Transactions on Consumer Electronics, No. 3, (Aug. 1993).
Robert et al., "Digital Cable: The Key to Your Content", Access Intelligence's Cable Group, Feb. 2002, online at http:www.cableworld.com/ct/archives/0202/0202digitalrights.htm.
Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.
Zhu, et al., "Coding and Cell-Loss Recovery in DCT-Based Packet Video", IEEE Transactions on Circuits and Systems for Video Technology, "ClearPlay: The Technology of Choice", from web site, ClearPlay 2001-2003.

ANONYMOUS, Message Authentication with Partial Encryption, Research disclosure RD 296086, Dec. 10, 1988.

"Performance Study of a Selective Encryption Scheme for the Security of Networked, Real-Time Video" by Spanos and Maples, pp. 2-10, 1995, IEEE.

"An Empirical Study of Secure MPEG Video Transmissions" by Agi and Gong, pp. 137-144, 1996, IEEE, Proceedings of SNDSS '96.

"Selective Encryption and Watermarking of MPEG Video (Extended Abstract)" by Wu and Wu, Feb. 1997, submitte to International Conference on Image Science, Systems, and Technology, CISST '97.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"DVD Demystified—The Guidebook for DVD-Video and DVD-ROM" by Jim Taylor, Pub. McGraw-Hill, 1998, ISBN: 0-07-064841-7, pp. 134-147.

"An Efficient MPEG Video Encryption Algorithm" by Shi and Bhargava, pp. 381-386, 1998 IEEE.

"Multimedia and Security Workshop at ACM Multimedia" '98, Bristol, U.K., Sep. 1998.

"Comparison of MPEG Encryption Algorithms" by Qiao and Nahrstedt, Jan. 17, 1998, Preprint submitted to Elsevier Science.

"Applying Encryption to Video Communication" by Kunkelmann, pp. 41-47, Sep. 1998, Multimedia and Security Workshop at ACM Multimedia '98. Bristol, U.K.

"Evaluation of Selective Encryption Techniques for Secure Transmission of MPEG-Compressed Bit-Streams" by Alattar and Al-Regib, pp. IV-340 to IV-343, 1999, IEEE.

"Improved Selective Encryption Techniques for Secure Transmission of MPEG Video Bit-Streams" by Alattar, Al-Regib and Al-Semari, pp. 256-260, 1999, IEEE.

"Efficient Frequency Domain Video Scrambling for Content Access Control" by Zeng and Lei, Nov. 1999, In Proc. ACM Multimedia.

"Transport Streams Insertion of Video in the Compressed Digital Domain" by SeaChange International, Web Site Literature, 2000.

"A Report on Security Issues in Multimedia" by Gulwani, Apr. 30, 2000, Course Notes, Department of Computer Science and Engineering, Indian Institute of Technology Kanpur.

"Fast Encryption Methods for Audiovisual Data Confidentiality" by Wu and Kuo, Nov. 2003, SPIE International Symposia on Information Technologies 2000, (Boston, Ma., USA).

"Visible World—A High Impact Approach to Customized Television Advertising" by Haberman, Dec. 2001.

"Ad Agencies and Advertisers To Be Empowered with Targeted Ads Delivered by Television's Prevailing Video Servers" Article Business Section of The New York Times, Updated Thursday, Dec. 20, 2001.

"Pre-Encryption Profiles—Concept Overview and Proposal", Rev. 1.2 as submitted to the Open CAS consortium on Dec. 28, 2000.

"Dynamic-Customized TV Advertising Creation and Production Tools" by SeaChange International, Web Site Literature.

"How Networks Work—Milennium Edition"—pp. 88-89, Que Corporation, 2000.

* cited by examiner

| | | | ... | | |
|---|---|---|---|---|---|
| SH1 | MB1 | MB2 | ... | MB32 | MB33 |
| SH2 | MB1 | MB2 | ... | MB32 | MB33 |
| SH3 | MB1 | MB2 | ... | MB32 | MB33 |
| SH4 | MB1 | MB2 | ... | MB32 | MB33 |
| SH5 | MB1 | MB2 | ... | MB32 | MB33 |
| SH6 | MB1 | MB2 | ... | MB32 | MB33 |
| SH7 | MB1 | MB2 | ... | MB32 | MB33 |
| SH8 | MB1 | MB2 | ... | MB32 | MB33 |
| SH9 | MB1 | MB2 | ... | MB32 | MB33 |
| SH10 | MB1 | MB2 | ... | MB32 | MB33 |
| SH11 | MB1 | MB2 | ... | MB32 | MB33 |
| SH12 | MB1 | MB2 | ... | MB32 | MB33 |
| SH13 | MB1 | MB2 | ... | MB32 | MB33 |
| SH14 | MB1 | MB2 | ... | MB32 | MB33 |
| SH15 | MB1 | MB2 | ... | MB32 | MB33 |
| SH16 | MB1 | MB2 | ... | MB32 | MB33 |
| SH17 | MB1 | MB2 | ... | MB32 | MB33 |
| SH18 | MB1 | MB2 | ... | MB32 | MB33 |
| SH19 | MB1 | MB2 | ... | MB32 | MB33 |
| SH20 | MB1 | MB2 | ... | MB32 | MB33 |
| SH21 | MB1 | MB2 | ... | MB32 | MB33 |
| SH22 | MB1 | MB2 | ... | MB32 | MB33 |
| SH23 | MB1 | MB2 | ... | MB32 | MB33 |
| SH24 | MB1 | MB2 | ... | MB32 | MB33 |
| SH25 | MB1 | MB2 | ... | MB32 | MB33 |
| SH26 | MB1 | MB2 | ... | MB32 | MB33 |
| SH27 | MB1 | MB2 | ... | MB32 | MB33 |
| SH28 | MB1 | MB2 | ... | MB32 | MB33 |
| SH29 | MB1 | MB2 | ... | MB32 | MB33 |
| SH30 | MB1 | MB2 | ... | MB32 | MB33 |

FIG. 6

| | | | | |
|---|---|---|---|---|
| SH1 | MB1 | MB2 | ... | MB32 | MB33 |
| SH2 | MB1 | MB2 | ... | MB32 | MB33 |
| SH3 | MB1 | MB2 | ... | MB32 | MB33 |
| SH4 | MB1 | MB2 | ... | MB32 | MB33 |
| SH5 | MB1 | MB2 | ... | MB32 | MB33 |
| SH6 | MB1 | MB2 | ... | MB32 | MB33 |
| SH7 | MB1 | MB2 | ... | MB32 | MB33 |
| SH8 | MB1 | MB2 | ... | MB32 | MB33 |
| SH9 | MB1 | MB2 | ... | MB32 | MB33 |
| SH10 | MB1 | MB2 | ... | MB32 | MB33 |
| SH11 | MB1 | MB2 | ... | MB32 | MB33 |
| SH12 | MB1 | MB2 | ... | MB32 | MB33 |
| SH13 | MB1 | MB2 | ... | MB32 | MB33 |
| SH14 | MB1 | MB2 | ... | MB32 | MB33 |
| SH15 | MB1 | MB2 | ... | MB32 | MB33 |
| SH16 | MB1 | MB2 | ... | MB32 | MB33 |
| SH17 | MB1 | MB2 | ... | MB32 | MB33 |
| SH18 | MB1 | MB2 | ... | MB32 | MB33 |
| SH19 | MB1 | MB2 | ... | MB32 | MB33 |
| SH20 | MB1 | MB2 | ... | MB32 | MB33 |
| SH21 | MB1 | MB2 | ... | MB32 | MB33 |
| SH22 | MB1 | MB2 | ... | MB32 | MB33 |
| SH23 | MB1 | MB2 | ... | MB32 | MB33 |
| SH24 | MB1 | MB2 | ... | MB32 | MB33 |
| SH25 | MB1 | MB2 | ... | MB32 | MB33 |
| SH26 | MB1 | MB2 | ... | MB32 | MB33 |
| SH27 | MB1 | MB2 | ... | MB32 | MB33 |
| SH28 | MB1 | MB2 | ... | MB32 | MB33 |
| SH29 | MB1 | MB2 | ... | MB32 | MB33 |
| SH30 | MB1 | MB2 | ... | MB32 | MB33 |

| SH1 | MB1 | MB2 | ... | MB32 | MB33 |
|---|---|---|---|---|---|
| SH2 | MB1 | MB2 | ... | MB32 | MB33 |
| SH3 | MB1 | MB2 | ... | MB32 | MB33 |
| SH4 | MB1 | MB2 | ... | MB32 | MB33 |
| SH5 | MB1 | MB2 | ... | MB32 | MB33 |
| SH6 | MB1 | MB2 | ... | MB32 | MB33 |
| SH7 | MB1 | MB2 | ... | MB32 | MB33 |
| SH8 | MB1 | MB2 | ... | MB32 | MB33 |
| SH9 | MB1 | MB2 | ... | MB32 | MB33 |
| SH10 | MB1 | MB2 | ... | MB32 | MB33 |
| SH11 | MB1 | MB2 | ... | MB32 | MB33 |
| SH12 | MB1 | MB2 | ... | MB32 | MB33 |
| SH13 | MB1 | MB2 | ... | MB32 | MB33 |
| SH14 | MB1 | MB2 | ... | MB32 | MB33 |
| SH15 | MB1 | MB2 | ... | MB32 | MB33 |
| SH16 | MB1 | MB2 | ... | MB32 | MB33 |
| SH17 | MB1 | MB2 | ... | MB32 | MB33 |
| SH18 | MB1 | MB2 | ... | MB32 | MB33 |
| SH19 | MB1 | MB2 | ... | MB32 | MB33 |
| SH20 | MB1 | MB2 | ... | MB32 | MB33 |
| SH21 | MB1 | MB2 | ... | MB32 | MB33 |
| SH22 | MB1 | MB2 | ... | MB32 | MB33 |
| SH23 | MB1 | MB2 | ... | MB32 | MB33 |
| SH24 | MB1 | MB2 | ... | MB32 | MB33 |
| SH25 | MB1 | MB2 | ... | MB32 | MB33 |
| SH26 | MB1 | MB2 | ... | MB32 | MB33 |
| SH27 | MB1 | MB2 | ... | MB32 | MB33 |
| SH28 | MB1 | MB2 | ... | MB32 | MB33 |
| SH29 | MB1 | MB2 | ... | MB32 | MB33 |
| SH30 | MB1 | MB2 | ... | MB32 | MB33 |

SLICE MASK AND MOAT PATTERN PARTIAL ENCRYPTION

CROSS REFERENCE TO RELATED DOCUMENTS

This application is a continuation in part of patent applications entitled "Critical Packet Partial Encryption" to Unger et al., Ser. No. 10/038,217; "Time Division Partial Encryption" to Candelore et al., Ser. No. 10/038,032; "Elementary Stream Partial Encryption" to Candelore, Ser. No. 10/037,914; "Partial Encryption and PID Mapping" to Unger et al., Ser. No. 10/037,499; and "Decoding and Decrypting of Partially Encrypted Information" to Unger et al., Ser. No. 10/037,498 all of which were filed on Jan. 2, 2002 and are hereby incorporated by reference herein.

This application is also related to and claims priority benefit of U.S. Provisional patent application Ser. No. 60/372,855 filed Apr. 16, 2002 to Candelore, et al. entitled "Method for Partially Scrambling Content by Encrypting Selected Macroblocks to Create Vertical and Horizontal 'Moats' to Make Recovery of Other Macroblocks More Difficult When Certain Anchor Information is Missing", and U.S. Provisional patent application Ser. No. 60/409,675, filed Sep. 9, 2002, entitled "Generic PID Remapping for Content Replacement", to Candelore which are hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of encryption. More particularly, this invention relates to a encryption method and apparatus particularly useful for scrambling packetized video content such as that provided by cable and satellite television systems.

BACKGROUND OF THE INVENTION

The above-referenced commonly owned patent applications describe inventions relating to various aspects of methods generally referred to herein as partial encryption or selective encryption. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 5 illustrates the slice structure of a frame of video data consistent with certain embodiments of the present invention.

FIG. 6 illustrates a video frame with encryption of odd numbered slices consistent with certain embodiments of the present invention.

FIG. 7 illustrates a video frame with encryption of even numbered slices consistent with certain embodiments of the present invention.

DETAILED DESCRIPTION OF THE INVENTION

Figure 1:
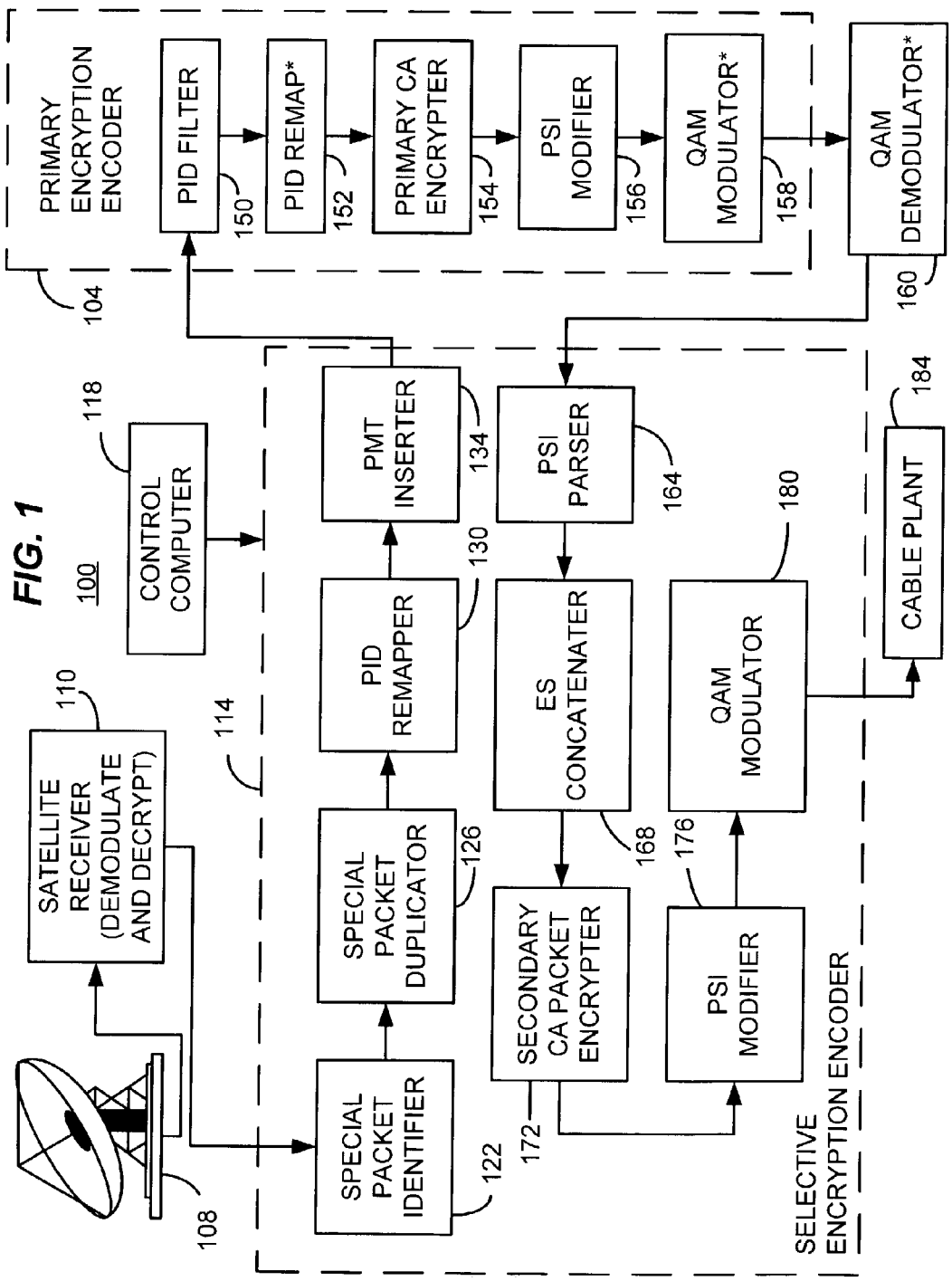
FIG. 1 is a block diagram of an exemplary cable system head end consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The terms "scramble" and "encrypt" and variations thereof are used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The present document generally uses the example of a "dual partial encryption" embodiment, but those skilled in the art will recognize that the present invention can be utilized to realize multiple partial encryption without departing from the invention. Partial encryption and selective encryption are used synonymously herein.

Turning now to FIG. 1, a head end 100 of a cable television system suitable for use in practicing a dual encryption embodiment of the present invention is illustrated. Those skilled in the art will appreciate that the present invention could also be implemented using more than two encryptions systems without departing from the present invention. The illustrated head end 100 implements the dual partial encryption scenario of the present invention by adapting the operation of a conventional encryption encoder 104 (such as those provided by Motorola, Inc. and Scientific-Atlanta, Inc., and referred to herein as the primary encryption encoder) with additional equipment.

Head end 100 receives scrambled content from one or more suppliers, for example, using a satellite dish antenna 108 that feeds a satellite receiver 110. Satellite receiver 110 operates to demodulate and descramble the incoming content and supplies the content as a stream of clear (unencrypted) data to a selective encryption encoder 114. The selective encryption encoder 114, according to certain embodiments, uses two passes or two stages of operation, to encode the stream of data. Encoder 114 utilizes a secondary conditional access system (and thus a second encryption method) in conjunction with the primary encryption encoder 104 which operates using a primary conditional access system (and thus a primary encryption method). A user selection provided via a user interface on a control computer 118 configures the selective encryption encoder 114 to operate in conjunction with either a Motorola or Scientific Atlanta cable network (or other cable or satellite network).

It is assumed, for purposes of the present embodiment of the invention, that the data from satellite receiver 110 is supplied as MPEG (Moving Pictures Expert Group) compliant packetized data. In the first stage of operation the data is passed through a Special Packet Identifier 122. Special Packet Identifier 122 identifies specific programming that is to be dual partially encrypted according to the present invention. The Special Packet Identifier 122 signals the Special Packet Duplicator 126 to duplicate special packets. The Packet Identifier (PID) Remapper 130, under control of the computer 118, remaps the PIDs of the elementary streams (ES) (i.e., audio, video, etc.) of the programming that shall remain clear and the duplicated packets to new PID values. The payload of the elementary stream packets are not altered in any way by Special Packet Identifier 122, Special Packet Duplicator 126, or PID remapper 130. This is done so that the primary encryption encoder 104 will not recognize the clear unencrypted content as content that is to be encrypted.

Figure 2:
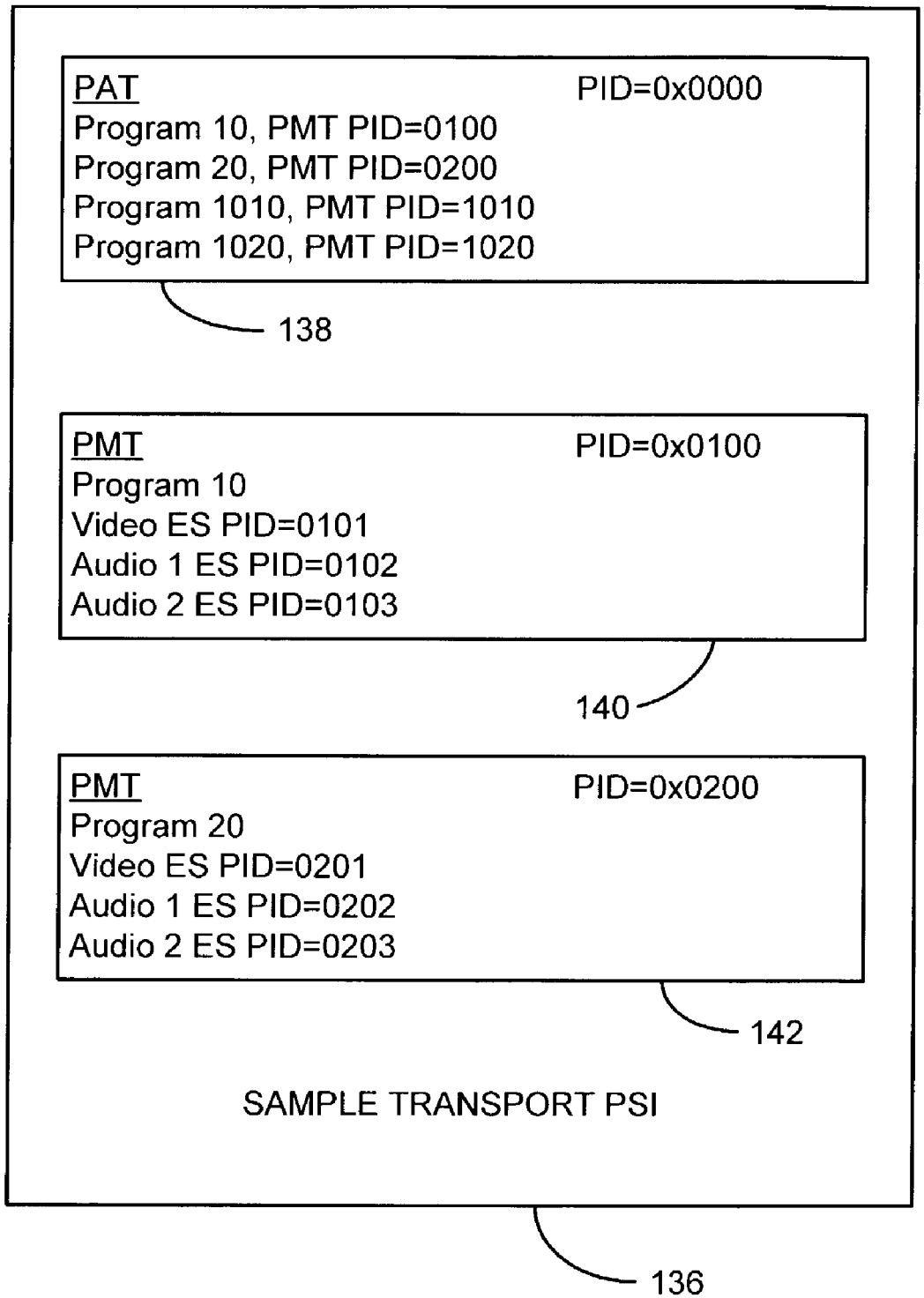
FIG. 2 is an illustration of sample transport stream PSI consistent with certain embodiments of the present invention.

The packets may be selected by the special packet identifier 122 according to one of the selection criteria described in the above-referenced applications or may use another selection criteria such as those which will be described later herein. Once these packets are identified in the packet identifier 122, packet duplicator 126 creates two copies of the packet. The first copy is identified with the original PID so that the primary encryption encoder 104 will recognize that it is to be encrypted. The second copy is identified with a new and unused PID, called a "secondary PID" (or shadow PID) by the PID Remapper 130. This secondary PID will be used later by the selective encryption encoder 114 to determine which packets are to be encrypted according to the secondary encryption method. FIG. 2 illustrates an exemplary set of transport PSI tables 136 after this remapping with a PAT 138 defining two programs (10 and 20) with respective PID values 0100 and 0200. A first PMT 140 defines a PID=0101 for the video elementary stream and PIDs 0102 and 0103 for two audio streams for program 10. Similarly, a second PMT 142 defines a PID=0201 for the video elementary stream and PIDs 0202 and 0203 for two audio streams for program 20.

As previously noted, the two primary commercial providers of cable head end encryption and modulation equipment are (at this writing) Motorola, Inc. and Scientific-Atlanta, Inc. While similar in operation, there are significant differences that should be discussed before proceeding since the present selective encryption encoder 114 is desirably compatible with either system. In the case of Motorola equipment, the Integrated Receiver Transcoder (IRT), an unmodulated output is available and therefore there is no need to demodulate the output before returning a signal to the selective encryption encoder 114, whereas no such unmodulated output is available in a Scientific-Atlanta device. Also, in the case of current Scientific-Atlanta equipment, the QAM, the primary encryption encoder carries out a PID remapping function on received packets. Thus, provisions are made in the selective encryption encoder 114 to address this remapping.

In addition to the above processing, the Program Specific Information (PSI) is also modified to reflect this processing. The original, incoming Program Association Table (PAT) is appended with additional Program Map Table (PMT) entries at a PMT inserter 134. Each added PMT entry contains the new, additional streams (remapped & shadow PIDs) created as part of the selective encryption (SE) encoding process for a corresponding stream in a PMT of the incoming transport. These new PMT entries will mirror their corresponding original PMTs. The program numbers will be automatically assigned by the selective encryption encoder 114 based upon open, available program numbers as observed from the program number usage in the incoming stream. The selective encryption System 114 system displays the inserted program information (program numbers, etc) on the configuration user interface of control computer 118 so that the Multiple System Operator (MSO, e.g., the cable system operator) can add these extra programs into the System Information (SI) control system and instruct the system to carry these programs in the clear.

Figure 3:
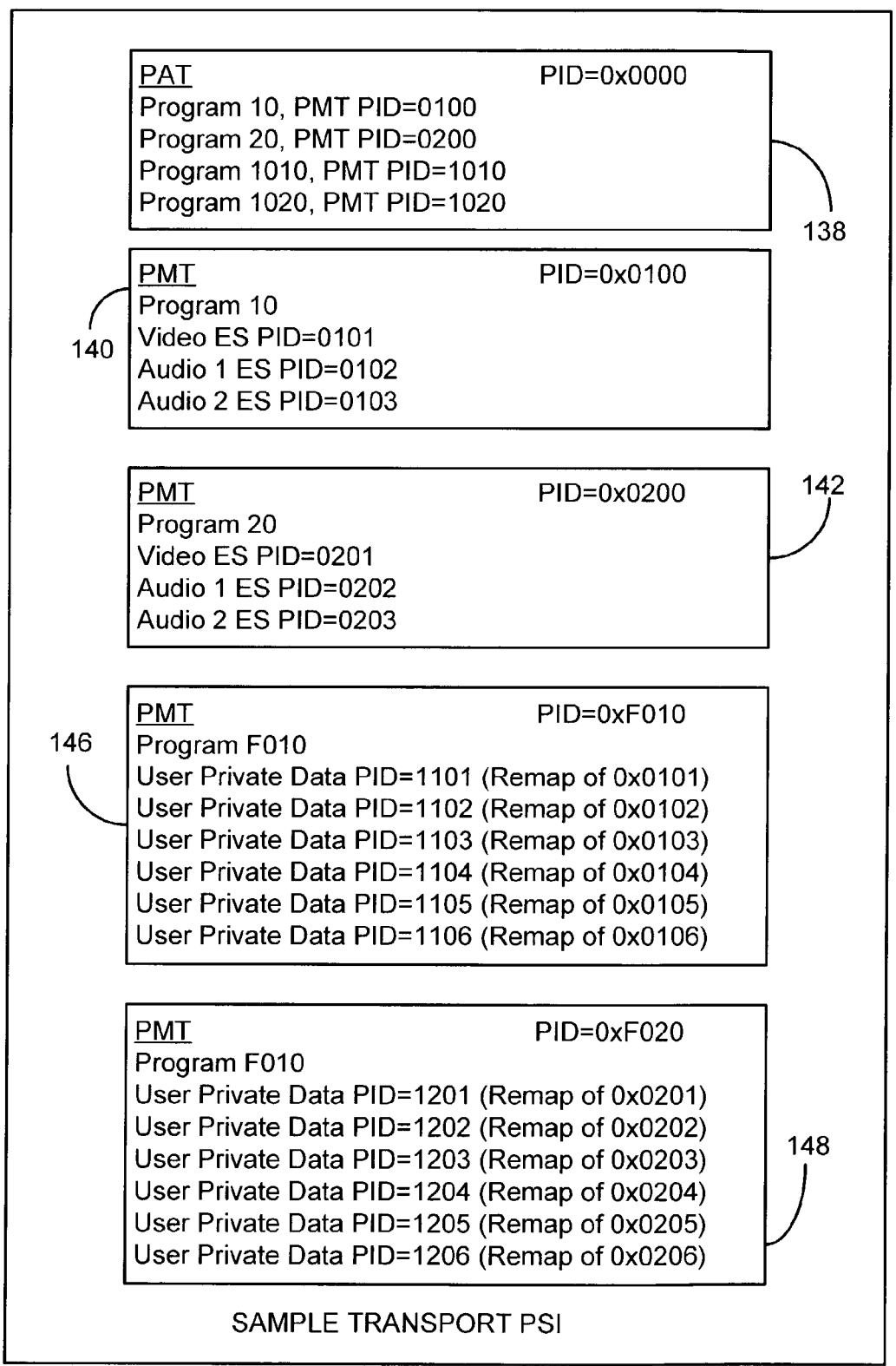
FIG. 3 is a further illustration of sample transport stream PSI consistent with certain embodiments of the present invention.

The modified transport PSI is illustrated as 144 in FIG. 3 with two additional temporary PMTs 146 and 148 appended to the tables of transport PSI 136. The appended PMTs 146 and 148 are temporary. They are used for the primary encryption process and are removed in the second pass of processing by the secondary encryption encoder. In accordance with the MPEG standard, all entries in the temporary PMTs are marked with stream type "user private" with an identifier of 0xF0. These PMTs describe the remapping of the PIDs for use in later recovery of the original mapping of the PIDs in the case of a PID remapping in the Scientific-Atlanta equipment. Of course, other identifiers could be used without departing from the present invention.

In order to assure that the Scientific-Atlanta PID remapping issue is addressed, if the selective encryption encoder 114 is configured to operate with a Scientific-Atlanta system, the encoder adds a user private data descriptor to each elementary stream found in the original PMTs in the incoming data transport stream (TS) per the format below (of course, other formats may also be suitable):

| Syntax | value | # of bits |
|---|---|---|
| private_data_indicator_descriptor( ) { | | |
| descriptor_tag | 0xF0 | 8 |
| descriptor_length | 0x04 | 8 |
| private_data_indicator( ) { | | |
| orig_pid | 0x???? | 16 |
| stream_type | 0x?? | 8 |
| reserved | 0xFF | 8 |
| } | | |
| } | | |

The selective encryption encoder 114 of the current embodiment also adds a user private data descriptor to each elementary stream placed in the temporary PMTs created as described above per the format below:

| Syntax | value | # of bits |
|---|---|---|
| private_data_indicator_descriptor( ) { | | |
| descriptor_tag | 0xF0 | 8 |
| descriptor_length | 0x04 | 8 |
| private_data_indicator( ) { | | |
| orig_pid | 0x???? | 16 |
| stream_type | 0x?? | 8 |
| reserved | 0xFF | 8 |
| } | | |
| } | | |

The in "????" the tables above is the value of the "orig_pid" which is a variable while the"??" is a "stream_type" value. The data field for "orig_pid" is a variable that contains the original incoming PID or in the case of remap or shadow PIDs, the original PID that this stream was associated with. The data field "stream_type" is a variable that describes the purpose of the stream based upon the chart below:

| Stream Type | Value |
|---|---|
| Legacy ES | 0x00 |
| Remapped ES | 0x01 |
| Shadow ES | 0x02 |
| Reserved | 0x03–0xFF |

These descriptors will be used later to re-associate the legacy elementary streams, which are encrypted by the Scientific-Atlanta, Inc. primary encryption encoder 104, with the corresponding shadow and remapped clear streams after PID remapping in the Scientific-Atlanta, Inc. modulator prior to the second phase of processing of the Selective Encryption Encoder. Those skilled in the art will appreciate that the above specific values should be considered exemplary and other specific values could be used without departing from the present invention.

In the case of a Motorola cable system being selected in the selective encryption encoder configuration GUI, the original PAT and PMTs can remain unmodified, providing the system does not remap PIDs within the primary encryption encoder. The asterisks in FIG. 1 indicate functional blocks that are not used in a Motorola cable system.

The data stream from selective encryption encoder 114 is passed along to the input of the primary encryption encoder 104 which first carries out a PID filtering process at 150 to identify packets that are to be encrypted. At 152, in the case of a Scientific-Atlanta device, a PID remapping may be carried out. The data are then passed along to an encrypter 154 that, based upon the PID of the packets encrypts certain packets (in accord with the present invention, these packets are the special packets which are mapped by the PID Remapper 130 to the original PID of the incoming data stream for the current program). The remaining packets are unencrypted. The data then passes through a PSI modifier 156 that modifies the PSI data to reflect changes made at the PID remapper. The data stream is then modulated by a quadrature amplitude modulation (QAM) modulator 158 (in the case of the Scientific-Atlanta device) and passed to the output thereof. This modulated signal is then demodulated by a QAM demodulator 160. The output of the demodulator 160 is directed back to the selective encryption encoder 114 to a PSI parser164.

The second phase of processing of the transport stream for selective encryption is to recover the stream after the legacy encryption process is carried out in the primary encryption encoder 104. The incoming Program Specific Information (PSI) is parsed at 164 to determine the PIDs of the individual elementary streams and their function for each program, based upon the descriptors attached in the first phase of processing. This allows for the possibility of PID remapping, as seen in Scientific-Atlanta primary encryption encoders. The elementary streams described in the original program PMTs are located at PSI parser 164 where these streams have been reduced to just the selected packets of interest and encrypted in the legacy CA system format in accord with the primary encryption method at encoder 104. The elementary streams in the temporary programs appended to the original PSI are also recovered at elementary stream concatenator 168. The packets in the legacy streams are appended to the remapped content, which is again remapped back to the PID of the legacy streams, completing the partial, selective encryption of the original elementary streams.

The temporary PMTs and the associated PAT entries are discarded and removed from the PSI. The user private data descriptors added in the first phase of processing are also removed from the remaining original program PMTs in the PSI. For a Motorola system, no PMT or PAT reprocessing is required and only the final secondary encryption of the transport stream occurs.

During the second phase of processing, the SE encoder 114 creates a shadow PSI structure that parallels the original MPEG PSI, for example, having a PAT origin at PID 0x0000. The shadow PAT will be located at a PID specified in the SE encoder configuration as indicated by the MSO from the user interface. The shadow PMT PIDs will be automatically assigned by the SE encoder 114 dynamically, based upon open, available PID locations as observed from PID usage of the incoming stream. The PMTs are duplicates of the original PMTs, but also Conditional Access (CA) descriptors added to the entire PMT or to the elementary streams referenced within to indicate the standard CA parameters and optionally, shadow PID and the intended operation upon the associated elementary stream. The CA descriptor can appear in the descriptor1( ) or descriptor2( ) loops of the shadow PMT. If found in descriptor1( ), the CA_PID called out in the CA descriptor contains the non-legacy ECM PID which would apply to an entire program. Alternatively, the ECM PID may be sent in descriptor2( ). The CA descriptor should not reference the selective encryption elementary PID in the descriptor1( ) area.

| CA_PID Definition | Secondary_CA_private_data Value |
|---|---|
| ECM PID | 0x00 |
| Replacement PID | 0x01 |
| Insertion PID | 0x02 |
| ECM PID | undefined (default) |

This shadow PSI insertion occurs regardless of whether the selective encryption operation is for a Motorola or Scientific Atlanta cable network. The elementary streams containing the duplicated packets of interest that were also assigned to the temporary PMTs are encrypted during this second phase of operation at secondary packet encrypter 172 in the secondary CA format based upon the configuration data of the CA system attached using the DVB (Digital Video Broadcasting) Simulcrypt™ standard.

The data stream including the clear data, primary encrypted data, secondary encrypted data and other information are then passed to a PSI modifier 176 that modifies the transport PSI information by deletion of the temporary PMT tables and incorporation of remapping as described above. The output of the PSI modifier 176 is modulated at a QAM modulator 180 and delivered to the cable plant 184 for distribution to the cable system's customers.

Figure 4:
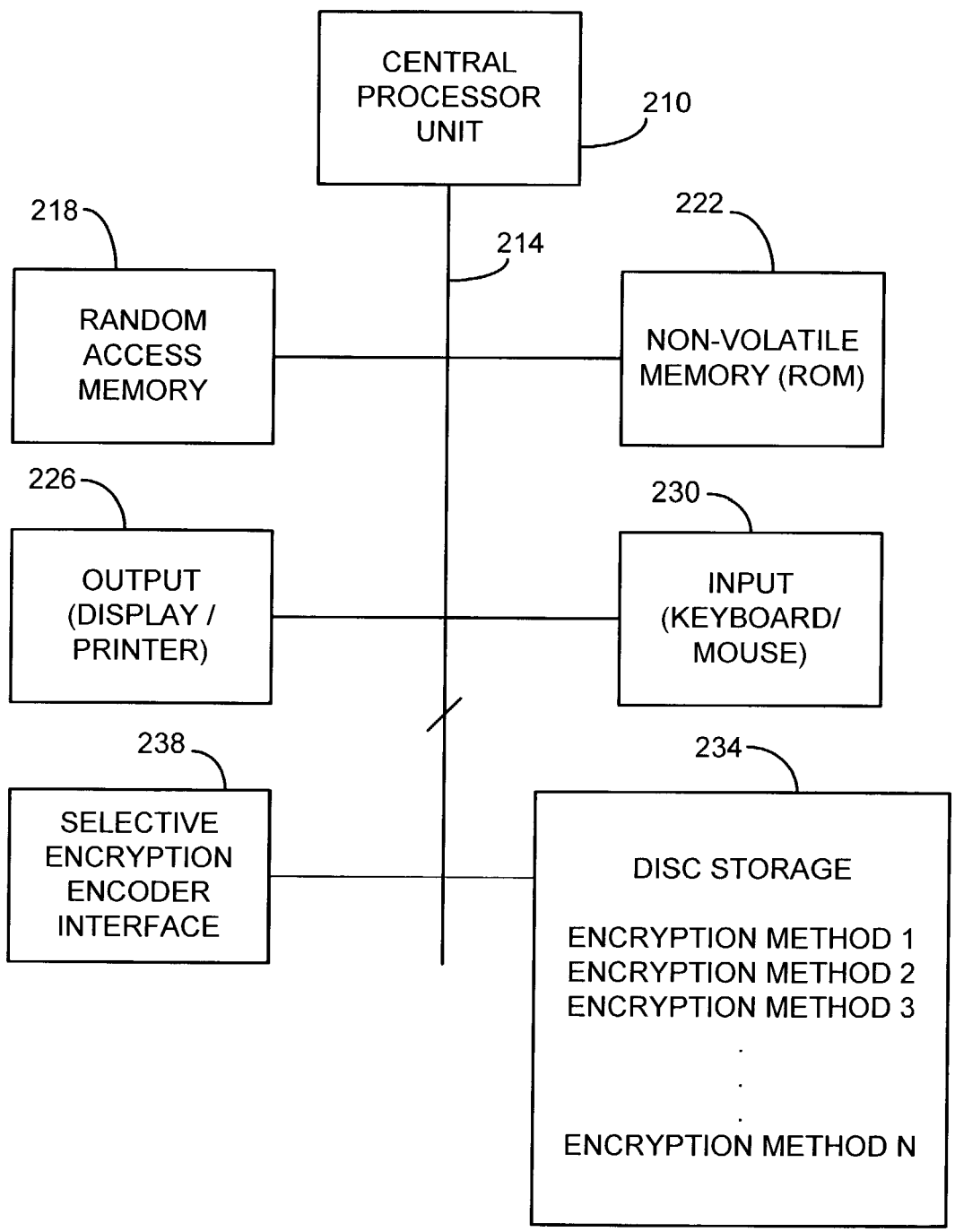
FIG. 4 is a block diagram of an illustrative control processor 100 consistent with certain embodiments of the present invention.

The control processor 100 may be a personal computer based device that is used to control the selective encryption encoder as described herein. An exemplary personal computer based controller 100 is depicted in FIG. 4. Control processor 100 has a central processor unit (CPU) 210 with an associated bus 214 used to connect the central processor unit 210 to Random Access Memory 218 and Non-Volatile Memory 222 in a known manner. An output mechanism at 226, such as a display and possibly printer, is provided in order to display and/or print output for the computer user as well as to provide a user interface such as a Graphical User Interface (GUI). Similarly, input devices such as keyboard and mouse 230 may be provided for the input of information by the user at the MSO. Computer 100 also may have disc storage 234 for storing large amounts of information including, but not limited to, program files and data files. Computer system 100 also has an interface 238 for connection to the selective encryption encoder 114. Disc storage 234 can store any number of encryption methods that can be downloaded as desired by the Multi-Service Operator (MSO) to vary the encryption on a regular basis to thwart hackers. Moreover, the encryption methods can be varied according to other criteria such as availability of bandwidth and required level of security.

The partial encryption process described above utilizes any suitable conditional access encryption method at encrypters 154 and 172. However, these encryption techniques are selectively applied to the data stream using a technique such as those described below or in the above-referenced patent applications. In general, but without the intent to be limiting, the selective encryption process utilizes intelligent selection of information to encrypt so that the entire program does not have to undergo dual encryption. By appropriate selection of appropriate data to encrypt, the program material can be effectively scrambled and hidden from those who desire to hack into the system and illegally recover commercial content without paying. The MPEG (or similar format) data that are used to represent the audio and video data does so using a high degree of reliance on the redundancy of information from frame to frame. Certain data can be transmitted as "anchor" data representing chrominance and luminance data. That data is then often simply moved about the screen to generate subsequent frames by sending motion vectors that describe the movement of the block. Changes in the chrominance and luminance data are also encoded as changes rather than a recoding of absolute anchor data.

In accordance with certain embodiments of the present invention, a method of dual encrypting a digital video signal involves examining unencrypted packets of data in the digital video signal to identify at least one specified packet type, the specified packet type comprising packets of data as will be described hereinafter; encrypting packets identified as being of the specified packet type using a first encryption method to produce first encrypted packets; encrypting the packets identified as being of the specified packet type using a second encryption method to produce second encrypted packets; and replacing the unencrypted packets of the specified packet type with the first encrypted packets and the second encrypted packets in the digital video signal to produce a partially dual encrypted video signal.

The MPEG specification defines a slice as " . . . a series of an arbitrary number of consecutive macroblocks. The first and last macroblocks of a slice shall not be skipped macroblocks. Every slice shall contain at least one macroblock. Slices shall not overlap. The position of slices may change from picture to picture. The first and last macroblock of a slice shall be in the same horizontal row of macroblocks. Slices shall occur in the bitstream in the order in which they are encountered, starting at the upper-left of the picture and proceeding by raster-scan order from left to right and top to bottom . . . ."

By way of example, to represent an entire frame of NTSC information, for standard resolution, the frame (picture) is divided into 30 slices (but in general j slices may make up a full frame). Each slice contains 33 variable length macroblocks (but in general can include k variable length macroblocks) of information representing a 16×16 pixel region of the image. This is illustrated as standard definition frame 250 of FIG. 5 with each slice starting with a slice header (SH1–SH30) and each slice having 33 macroblocks (MB1–MB33). By appropriate selection of particular data representing the frame, the image can be scrambled beyond recognition in a number of ways as will be described below. By variation of the selection criteria for selective encryption, hackers can be thwarted on a continuing basis. Moreover, the selection criteria can be changed to adapt to bandwidth requirements as well as need for security of particular content (or other criteria).

Several techniques are described below for encryption of the selected data. In each case, for the current embodiment, it will be understood that selection of a particular type of information implies that the payload of a packet carrying such data is encrypted. However, in other environments, the data itself can be directly encrypted. Those skilled in the art will appreciate that such variations as well as others are possible without departing from the present invention. Moreover, those skilled in the art will appreciate that many variations and combinations of the encryption techniques described hereinafter can be devised and used singularly or in combination without departing from the present invention.

Slice Mask Encryption In accordance with one embodiment consistent with the invention referred to herein as "slice mask encryption", a different set of slice headers are encrypted from frame to frame. When a slice header is encrypted, the content for that slice is "frozen" on the screen, while content on adjoining slices is updated. This has the effect of breaking up the image on the screen. In certain embodiments, certain slices can be encrypted more often than others to thus deny the decoder the ability to update the content in those slices.

One embodiment of slice mask encryption is illustrated in FIG. 6 and FIG. 7. In FIG. 6, a frame of video 270 is illustrated as 30 slices with each slice having a slice header and 33 macroblocks with alternating odd numbered slices being encrypted. In certain embodiments, the entire slice can be encrypted while in others, only key information in the slice is encrypted (e.g., the slice header, or slice header and first macroblock, or slice header and all intra-coded macroblocks in the slice). Frame 280 of FIG. 7, by contrast, has all even numbered slices encrypted. As with frame 270, in certain embodiments, the entire slice can be encrypted while in others, only key information in the slice is encrypted (e.g., the slice header, or slice header and first macroblock, or slice header and all intra-coded macroblocks in the slice). In one embodiment, odd slice encryption as in frame 270 can be alternated with even slice encryption as in frame 280. In connection with the present embodiment, alternating video frames can be encrypted with odd or even slice encryption, with alternating video frames meaning every other frame or every other I, P or B frame.

Figure 8:
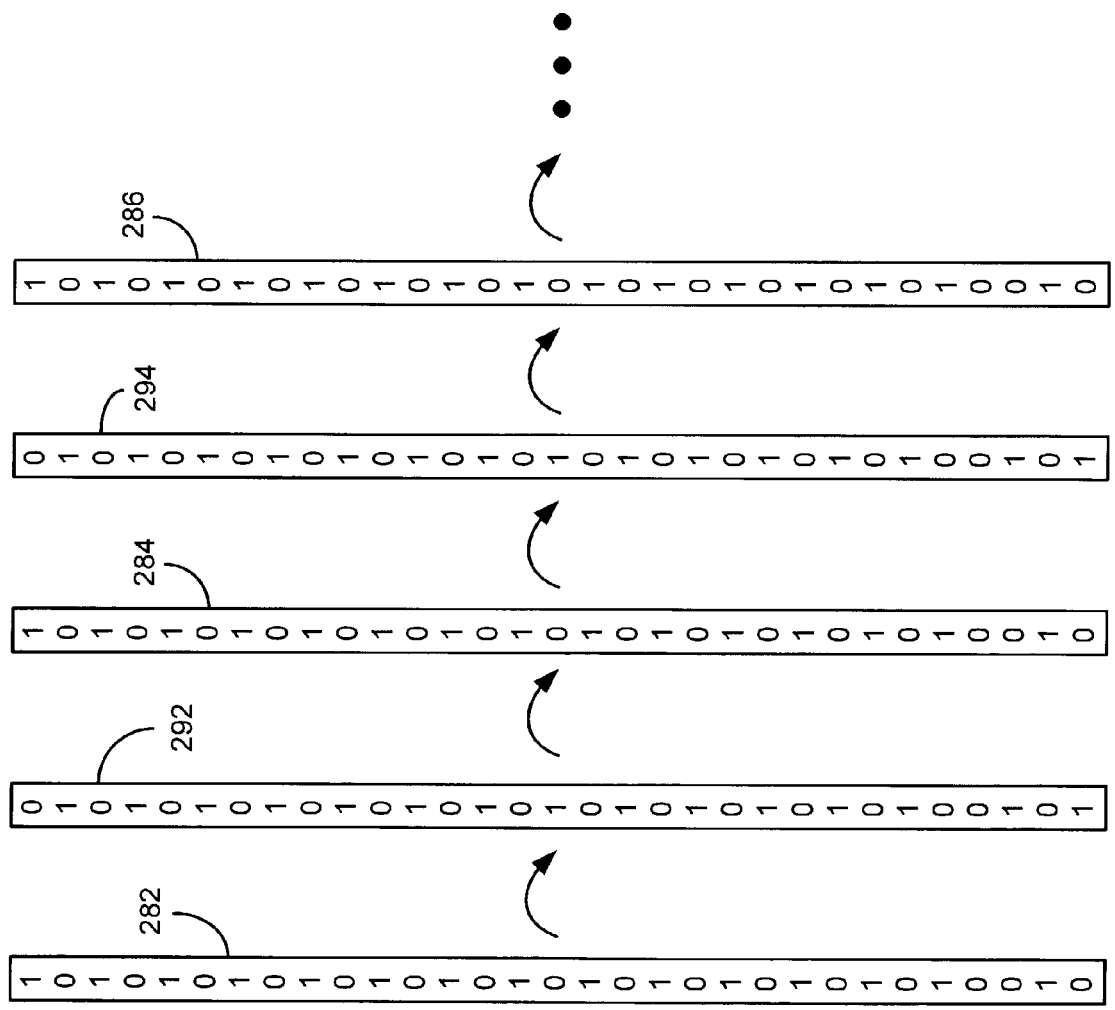
FIG. 8 illustrates a sequence of slice masks used to produce alternating odd and even numbered encrypted slices in a manner consistent with certain embodiments of the present invention.

The slice that is to be encrypted can be coded or represented using a slice mask as shown in FIG. 8. The slice masks of FIG. 8 are simply binary one dimensional arrays that contain a 1 to indicate that a slice is to be encrypted and a 0 to indicate that the slice is to be unencrypted (or similar code designation). Thus, for example, slice masks 282, 284 and 286 represent odd slice encryption while slice masks 292 and 294 represent even slice encryption. Such arrays can be stored or generated, in one embodiment, for use in determining which slice is to be encrypted. These masks may be applied to any of the following: only I frames, both I frames and P frames, or only P frames. Moreover, different masks may be used for I frames than P frames. In this illustrative example, fifteen packets/frame can be encrypted to encrypt the slice headers of the slices corresponding to 1 in the slice mask. This results in a low percentage of the actual data in a video frame actually being encrypted.

The encryption of a slice can depend on any of the following:
  The location of the slice in the frame (with higher density towards the "active" part of the screen)
  Whether found in an I, P or B frame (higher to lower priority)
  # of patterns or masks used before they are repeated Encrypting I frame slices eliminates anchor chrominance/luminance data used by the other types of frames. Encrypting P frame slices eliminates both anchor chrominance/luminance as well as motion vector data. Anchor chrominance/luminance can come in the form of scene changes, and if the content is Motorola encoded, then "progressive" I slices. The effect of Frame Mask encryption can be very effective. Experiments have shown that for a Motorola encoded program, encrypting only 3% of the packets can make it difficult to identify any objects in an image.

Figure 9:
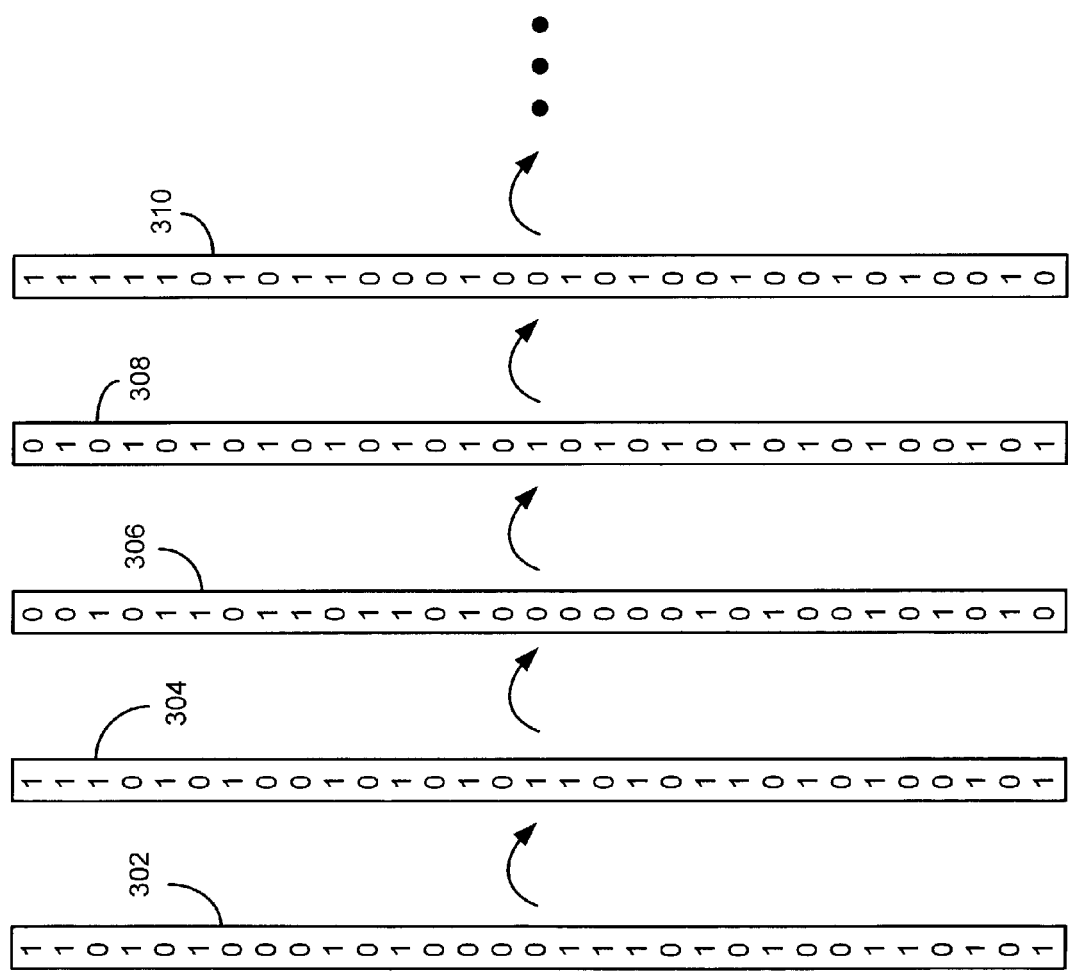
FIG. 9 illustrates a sequence of slice masks used to produce random encryption of frame slices in a manner consistent with certain embodiments of the present invention.

In variations of the embodiment described above, slice masks can be varied according to any suitable algorithm. For example, FIG. 9 illustrates random variation in the slice masks from frame to frame. Each of the slice masks 302, 304, 306, 308 and 310 is randomly (or equivalently, pseudo-randomly) generated so that a random array of slices is encrypted (e.g., by encryption of the payload of a packet containing the slice header) at each frame.

In another variation, it is noted that selected portions of the frame can be deemed the "active region" of the image. This region is somewhat difficult to define and is somewhat content dependent. But, generally speaking it is approximately a central area of the frame. More commonly, it is approximately an upper central portion of the frame of approximately half (say, one third to ¾) of the overall area of the frame centered at approximately the center of the frame horizontally and approximately the tenth to fifteenth slice. In accordance with this variation, random or pseudo-random slices are encrypted (e.g., by encryption of packets containing the slice header) with a weighting function applied to cause the active region of the image to be encrypted with greater frequency than other portions of the image. By way of example, and not limitation, assume that the center of the image is the active region. In this case, for example, a linear or a bell shaped weighting function can be applied to the random selection of slices to encrypt so that slices near the center are more frequently encrypted than those at the top or bottom of the image. In another example, assume that slices 8–22 of a 30 slice frame are deemed to bound the active region. Slices can then be randomly selected in each frame for encryption with a multiplication factor used to increase the likelihood that slices 8–22 will be encrypted. For example, those slices can be made twice or three times as likely to be encrypted as other slices. Equivalently, slices 1–7 and 23–30 can be made less likely to be encrypted. Any suitable pattern of macroblocks within a slice can be encrypted in order to encrypt the slice. Other variations will occur to those skilled in the art upon consideration of the present teachings.

Moat Pattern Encryption

Figure 10:
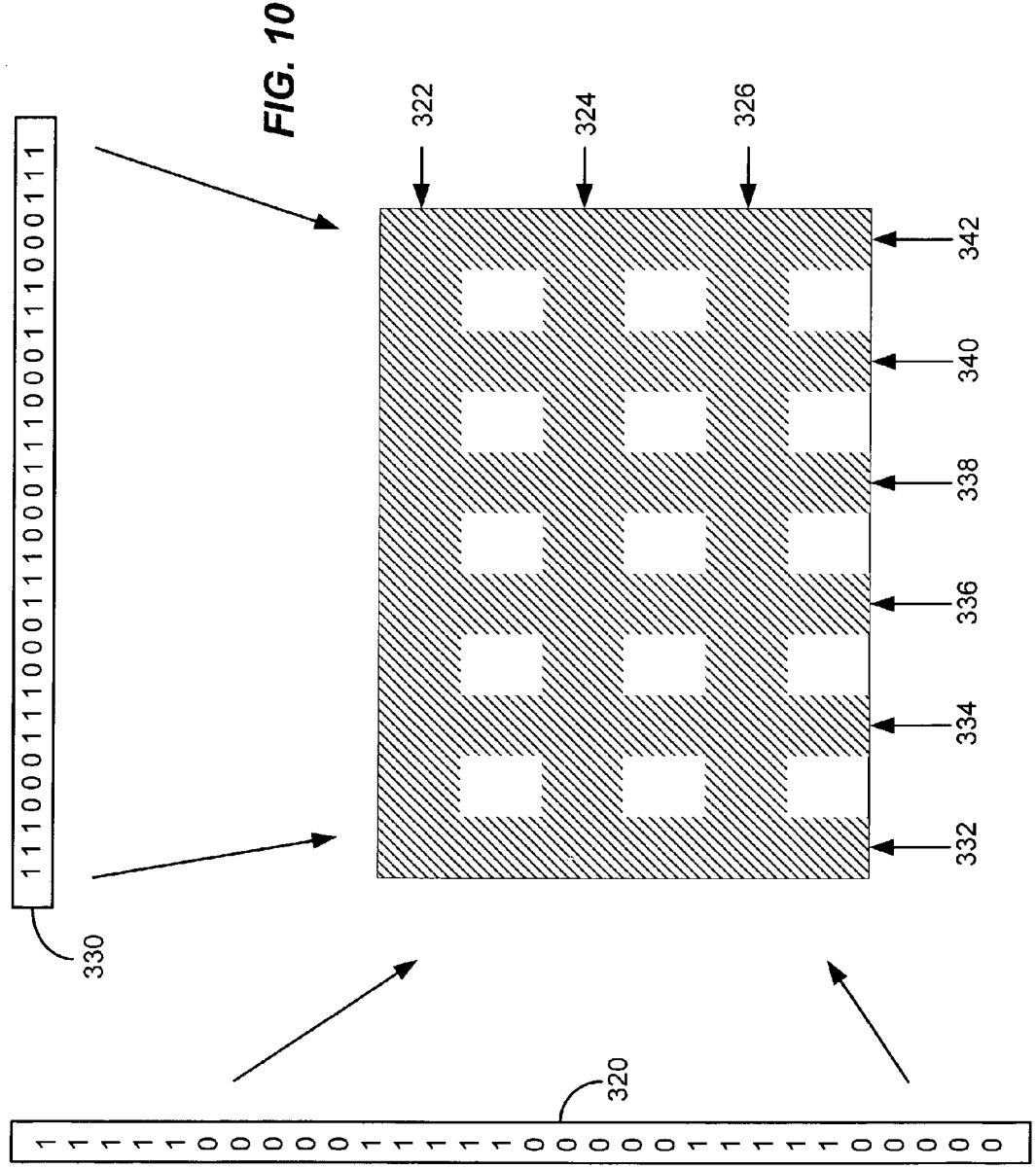
FIG. 10 illustrates a pattern of horizontal moats and vertical motes forming a checkerboard pattern representing encrypted portions of video.

The above slice mask encryption technique can be viewed as creating horizontal "moats" of encrypted information in the video frame, with each moat corresponding to a single slice in width. The moat width can be varied by encrypting multiple adjacent slices. In a similar manner, vertical "moats" can be generated by selecting macroblocks of data to be encrypted in a particular frame of data. This is depicted in FIG. 10 by an array of binary data 320 that represents encryption of slices 1–5,11–15 and 21–25 to create three horizontal moats 322, 324 and 326 respectively (each being 5 slices in width) in a video frame. This array may be referred to as a horizontal moat mask or slice mask. In a similar manner, an array of binary data 330 represents a vertical moat mask for encryption of macroblocks numbered 1–3, 7–9, 13–15, 19–21, 24–27 and 31–33 to create six vertical moats 332, 334, 336, 338, 340 and 342 respectively (each being three macroblocks in width). Of course, other patterns of horizontal and/or vertical moats can also be generated, for example, with greater or lesser density, greater or lesser moat width, greater emphasis on an active portion of the image or randomly generated moats, without departing from the present invention.

To create the moats in accordance with preferred embodiments, intra-coded macroblocks in the vertical and horizontal stripe through the image are encrypted. By encrypting the intra-coded macroblocks, inter-coded macroblocks are left without reference data and become meaningless, thus effectively scrambling the video image. In other embodiments, the horizontal stripes can be encrypted by any suitable technique including, but not limited to, encryption of the slice header, encryption of the slice header plus the first macroblock, encryption of all macroblocks in the slice or any other suitable technique. Similarly, the vertical stripes can be encrypted by encryption of intra-coded macroblocks or all macroblocks in the stripe without departing from the invention.

It should be noted that to encrypt certain macroblocks generally suggests that the payload of a packet carrying the macroblock is encrypted. This further implies that, in fact, more data on one side, the other or both of the target macroblock will also be encrypted. This results in even greater amounts of data being encrypted and thus greater encryption security.

In one embodiment of this encryption mode, it is assumed that the first macroblock with absolute DC luminance and chrominance information is encrypted. Each macroblock after that is encrypted differentially from the macroblock to the left to produce the horizontal stripes.

By breaking up the image up into a checker board pattern as illustrated, the vertical moats prevent the direct calculation of all the macroblocks on a slice with one good known value anywhere on the slice. Although a known value may be obtained by correlation of macroblocks from previous frames of the same slice or clear intracoded macroblocks from another part of the slice, this is generally inadequate to provide an effective hack to the encryption method. By use of the checkerboard pattern of encryption, the correlated macroblock would only "fix" the macroblocks in the particular checkerboard square in which that macroblock is located . . . not the entire slice. Thus, the vertical moat creates a discontinuity which increases distortion in the image.

Likewise for horizontal encrypted moats. This encryption technique prevents intracoded macroblocks from slices below or above the encrypted slice from being used to correct information in macroblocks above or below. The horizontal stripe or moat creates a discontinuity that disrupts a hacker's ability to obtain enough reference data to effectively decrypt the image. This checker board pattern produces a bandwidth savings in a dual or multiple encryption scenario which is substantially reduced compared with 100% encryption of the slice.

Multiple combinations of the encryption techniques are possible to produce encryption that has varying bandwidth requirements, varying levels of security and varying complexity. Such encryption techniques can be selected by control computer 118 in accordance with the needs of the MSO. The above-described encryption techniques can provide several additional choices to enrich a pallette of encryption techniques that can thus be selected by control computer 118 to vary the encryption making hacking more difficult.

Numerous other combinations of the above encryption techniques as well as those described in the above-referenced patent applications and other partial encryption techniques can be combined to produce a rich pallette of encryption techniques from which to select. In accordance with certain embodiments of the present invention, a selection of packets to encrypt can be made by the control computer 118 in order to balance encryption security with bandwidth and in order to shift the encryption technique from time to time to thwart hackers.

Figure 11:
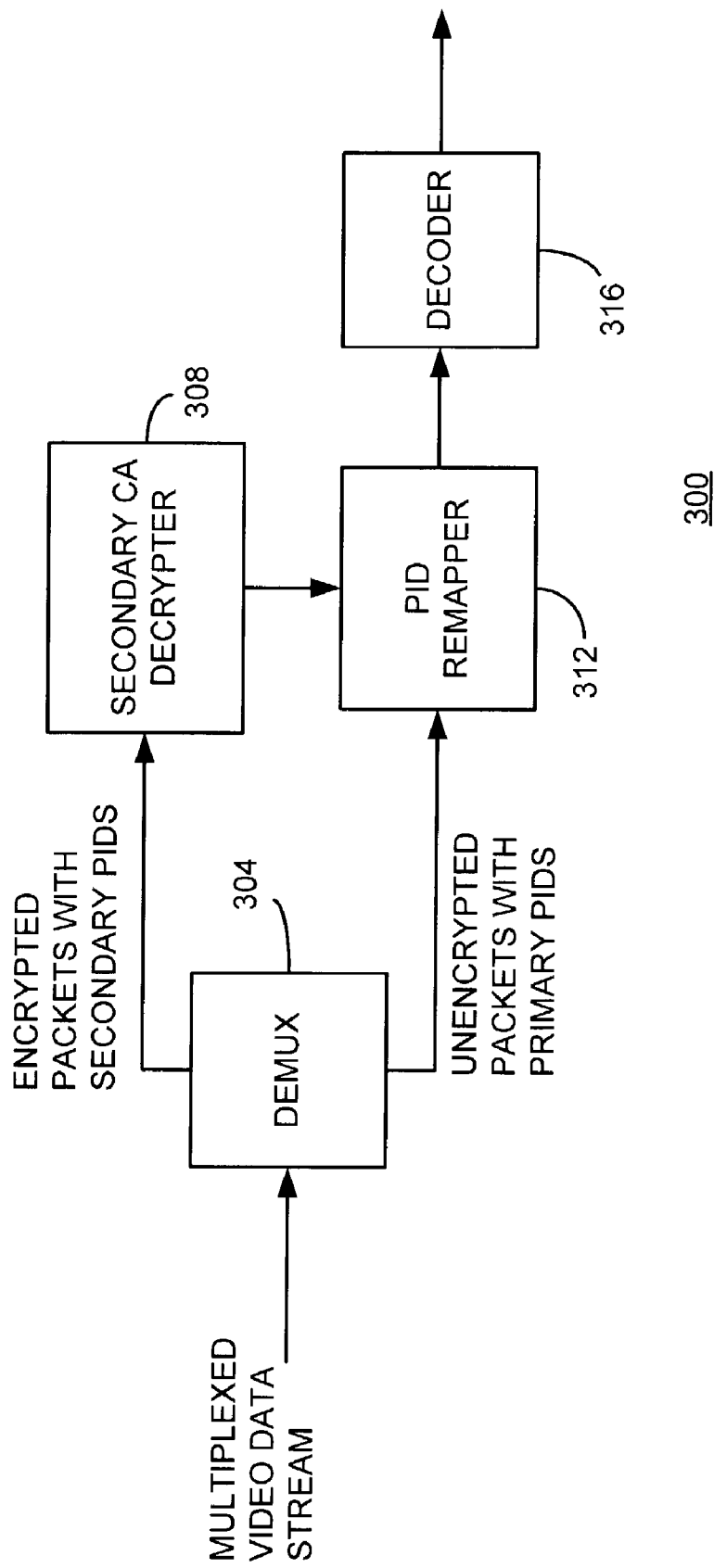
FIG. 11 illustrates a television Set-top box that decrypts and decodes in a manner consistent with certain embodiments of the present invention.

An authorized set-top box such as 300 illustrated in FIG. 11 operating under the secondary CA system decrypts and decodes the incoming program by recognizing both primary and secondary PIDs associated with a single program. The multiplexed video data stream containing both PIDs is directed to a demultiplexer 304. When a program is received that contains encrypted content that was encrypted by any of the above techniques, the demultiplexer directs encrypted packets containing encrypted content and secondary PIDS to a secondary CA decrypter 308. These packets are then decrypted at 308 and passed to a PID remapper 312. As illustrated, the PID remapper 312 receives packets that are unencrypted and bear the primary PID as well as the decrypted packets having the secondary PID. The PID remapper 312 combines the decrypted packets from decrypter 308 with the unencrypted packets having the primary PID to produce an unencrypted data stream representing the desired program. PID remapping is used to change either the primary or secondary PID or both to a single PID. This unencrypted data stream can then be decoded normally by decoder 316. Some or all of the components depicted in FIG. 11 can be implemented and/or controlled as program code running on a programmed processor, with the code being stored on an electronic storage medium.

Figure 12:
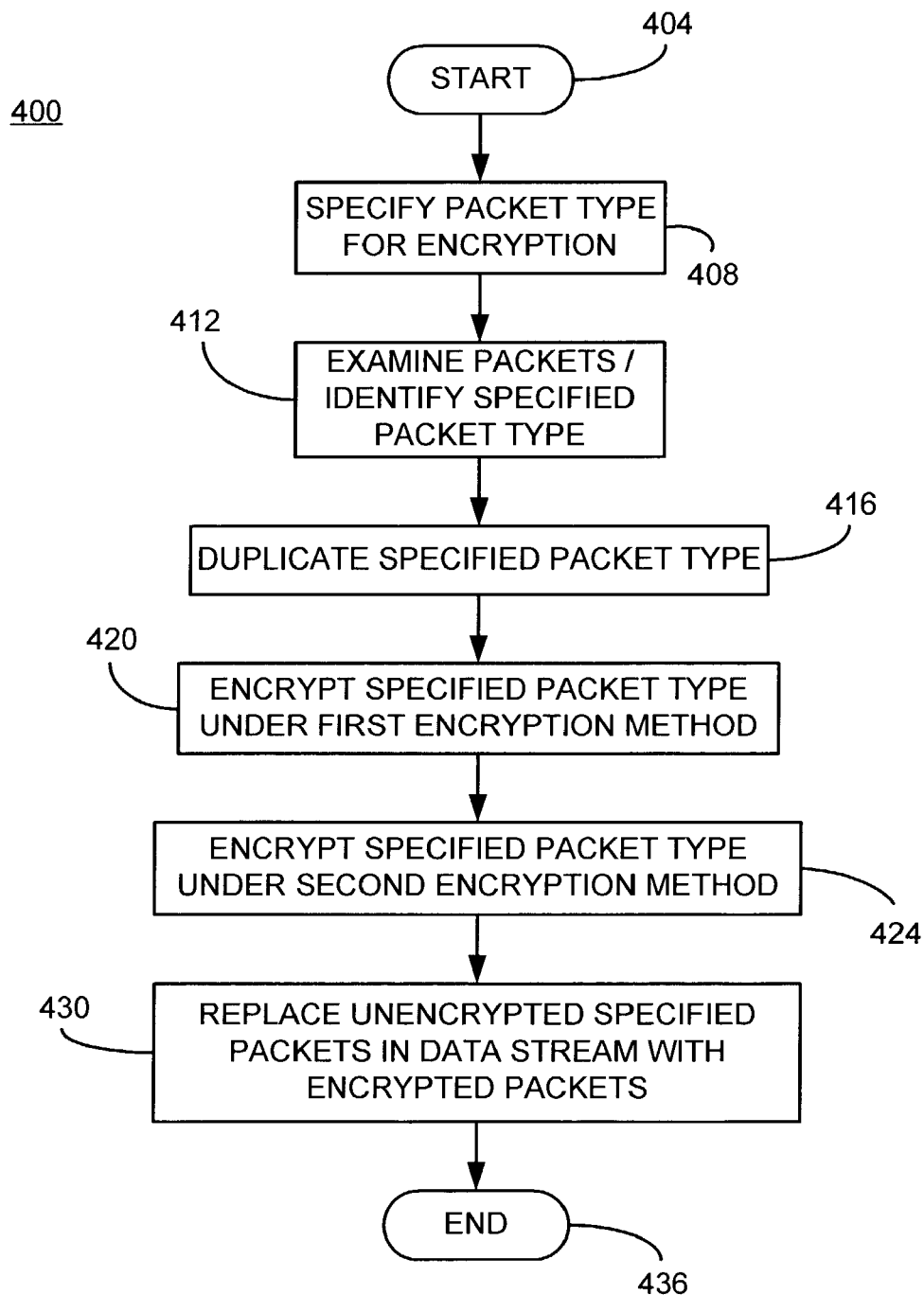
FIG. 12 is a flow chart broadly illustrating an encryption process consistent with embodiments of the present invention.

FIG. 12 is a flow chart 400 that broadly illustrates the encryption process consistent with certain embodiments of the present invention starting at 404. At 408 the packet type that is to be encrypted is specified. In accordance with certain embodiments consistent with the present invention, the selected packet type may be packets containing data representing vertical and/or horizontal stripes in a video frame. Packets are then examined at 412 to identify packets of the specified type. At 416, the identified packets are duplicated and at 420 one set of these packets is encrypted under a first encryption method. The other set of identified packets is encrypted at 424 under a second encryption method. The originally identified packets are then replaced in the data stream with the two sets of encrypted packets at 430 and the process ends at 436.

While the above embodiments describe encryption of packets containing the selected data type, it is also possible to encrypt the raw data prior to packetizing without departing from this invention and such encryption is considered equivalent thereto.

Those skilled in the art will recognize that the present invention has been described in terms of exemplary embodiments based upon use of a programmed processor (e.g., processor 118, processors implementing any or all of the elements of 114 or implementing any or all of the elements of 300). However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium or transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another. In the present exemplary embodiments, MPEG compliant packets, slices, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A selective encryption encoder, comprising:
   a packet identifier that identifies packets of a specified packet type, the specified packet type comprising packets carrying data representing a pattern of horizontal stripes across an image;
   a packet duplicator that duplicates the identified packets to produce first and second sets of the identified packets;
   means for sending and receiving packets to and from a primary encryption encoder to encrypt the first set of identified packets under a first encryption method; and
   a secondary encrypter for encrypting the second set of identified packets under a second encryption method.

2. The selective encryption encoder according to claim 1, wherein the horizontal stripes are encrypted by encryption of slice headers in the horizontal stripes.

3. The selective encryption encoder according to claim 2, wherein the horizontal stripes are encrypted by encryption of slice headers plus the first macroblock in each slice of the horizontal stripes.

4. The selective encryption encoder according to claim 1, wherein the horizontal stripes are encrypted by encryption of macroblocks containing intra-coded data in the horizontal stripes.

5. The selective encryption encoder according to claim 1, wherein the horizontal stripes are encrypted by encryption of all macroblocks in the horizontal stripes.

6. The selective encryption encoder according to claim 1, wherein the horizontal stripes are encrypted by encryption of a predefined pattern of macroblocks in the horizontal stripes.

7. The selective encryption encoder according to claim 1, wherein the horizontal stripes are encrypted by encryption of a predefined pattern of packets in the horizontal stripes.

8. The selective encryption encoder according to claim 1, wherein the horizontal stripes are encrypted according to a binary array fanning a slice mask, and wherein the binary array provides a code for encryption of slices within the image.

9. The selective encryption encoder according to claim 8, wherein the binary array is 2-dimensional with one dimension representing the slice number, and other dimension representing either one of packets and macroblocks in each slice.

10. The selective encryption encoder according to claim 8, wherein the horizontal stripes are encrypted by encryption of slice headers for slices coded for encryption.

11. The selective encryption encoder according to claim 8, wherein the slices are encrypted by encryption of slice headers plus a first macroblock For slices coded for encryption.

12. The selective encryption encoder according to claim 8, wherein the slices are encrypted by encryption of macroblocks containing intra-coded data for slices coded for encryption.

13. The selective encryption encoder according to claim 1, wherein the pattern of horizontal stripes corresponds to odd numbered slices and even numbered slices on alternating video frames.

14. A selective encryption encoder, comprising:
   a packet identifier that identifies packets of a specified packet type, the specified packet type comprising packets carrying data representing a pattern of horizontal stripes across an image;
   a packet duplicator that duplicates the identified packets to produce first and second sets of the identified packets;
   means for sending and receiving packets to and from a primary encryption encoder to encrypt the first set of identified packets under a first encryption method;
   a secondary encrypter for encrypting the second set of identified packets under a second encryption method; and
   wherein the horizontal stripes are encrypted according to a two-dimensional binary array with one dimension representing the slice number, and other dimension representing either one of packets and macroblocks in each slice, and wherein the binary array provides a code for encryption of the packets or macroblocks comprising the slices within the image.

15. A method of partially encrypting a digital video signal, comprising:
   examining unencrypted packets of data in the digital video signal to identify a specified packet type, the specified packet type comprising packets carrying data representing a pattern of horizontal stripes across an image;

encrypting packets identified as being of the specified packet type using a first encryption method to produce first encrypted packets; and replacing the unencrypted packets of the specified packet type with the first encrypted packets in the digital video signal to produce a partially encrypted video signal; and wherein the horizontal stripes are encrypted according to a two-dimensional binary array with one dimension representing the slice number, and other dimension representing either one of packets and macroblocks in each slice, and wherein the binary array provides a code for encryption of the packets or macroblocks comprising the slices within the image.

16. A computer readable tangible electronic storage device storing instructions which, when executed on a programmed processor, carry out the method of encrypting a digital video signal according to claim 15.

17. A method of partially dual encrypting a digital video signal, comprising:

examining unencrypted packets of data in the digital video signal to identify a specified packet type, the specified packet type comprising both packets carrying data representing a pattern of horizontal stripes across an image and packets carrying data representing a pattern of vertical stripes across the image;

encrypting packets identified as being of the specified packet type using a first encryption method to produce first encrypted packets;

encrypting the packets identified as being of the specified packet type using a second encryption method to produce second encrypted packets; and replacing the unencrypted packets of the specified packet type with the first encrypted packets and the second encrypted packets in the digital video signal to produce a partially dual encrypted video signal; and wherein the horizontal stripes are encrypted according to a two-dimensional binary ray with one dimension representing the slice number, and other dimension representing either one of packets and macroblocks in each slice, and wherein the binary array provides a code for encryption of the packets or macroblocks comprising the slices within the image.

18. A computer readable tangible electronic storage device storing instructions which, when executed on a programmed processor, carry out the method of encrypting a digital video signal according to claim 17.

19. A selective encryption encoder, comprising:

a packet identifier that identifies packets of a specified packet type, the specified packet type comprising both packets carrying data representing a pattern of horizontal stripes across an image and packets carrying data representing a pattern of vertical stripes across an image;

a packet duplicator that duplicates the identified packets to produce first and second sets of the identified packets;

means for sending and receiving packets to and from a primary encryption encoder to encrypt the first set of identified packets under a first encryption method;

a secondary encrypter for encrypting the second set of identified packets under a second encryption method; and wherein the horizontal stripes are encrypted according to a two-dimensional binary array with one dimension representing the slice number, and other dimension representing either one of packets and macroblocks in each slice, and wherein the binary array provides a code for encryption of the packets or macroblocks comprising the slices within the image.

20. A method of partially encrypting a digital video signal, comprising:

examining unencrypted packets of data in the digital video signal to identify a specified packet type, the specified packet type comprising both packets carrying data representing a pattern of horizontal stripes across an image and packets carrying data representing a pattern of vertical stripes across an image;

encrypting packets identified as being of the specified packet type using a first encryption method to produce first encrypted packets; and replacing the unencrypted packets of the specified packet type with the first encrypted packets in the digital video signal to produce a partially encrypted video signal; and wherein the horizontal stripes are encrypted according to a two-dimensional binary array with one dimension representing the slice number, and other dimension representing either one of packets and macroblocks in each slice, and wherein the binary array provides a code for encryption of the packets or macroblocks comprising the slices within the image.

21. A computer readable tangible electronic storage device storing instructions which, when executed on a programmed processor, carry out the method of encrypting a digital video signal according to claim 20.

22. A television set-top box, comprising:

a receiver receiving a digital television signal comprising:

a plurality of unencrypted packets;

a plurality of encrypted packets, wherein certain of the encrypted packets represent at least one of a pattern of horizontal stripes across an image and a pattern of vertical stripes across the image; and wherein the plurality of encrypted packets comprise a plurality of pairs of redundant packets containing redundant information encrypted, where one of each pair is encrypted under a first encryption method and the other of the pair is encrypted using a second encryption method:

a decrypter that decrypts the encrypted packets encrypted under the first encryption method; and a decoder, that decodes the unencrypted packets and the decrypted packets to produce a signal suitable for play on a television set.

23. A selective encryption decoder, for decrypting and decoding a selectively encrypted digital video signal, comprising:

a demultiplexer that receives packets of digital video, certain of the packets being unencrypted and certain of the packets being encrypted, wherein certain of the encrypted packets represent at least one of a pattern of horizontal stripes across an image and a pattern of vertical stripes across the image;

the unencrypted packets having a first packet identifier (PID) and the encrypted packets having a second packet identifier (PID);

a decrypter receiving the encrypted packets having the second PID and decrypting the encrypted packets using a first encryption method to produce decrypted packets;

a PID remapper that changes at least one of the first and second PIDs so that the unencrypted packets and the decrypted packets have the same PID; and a decoder that decodes the unencrypted and decrypted packets to produce a decoded video signal.

24. A method of decrypting and decoding a selectively encrypted digital video signal, comprising:

receiving packets of digital video, certain of the packets being unencrypted and certain of the packets being encrypted, wherein certain of the encrypted packets represent at least one of a pattern of horizontal stripes across an image and a pattern of vertical stripes across the image;

the unencrypted packets having a first packet identifier (PID) and the encrypted packets having a second packet identifier (PID); decrypting the encrypted packets having the second PID to produce decrypted packets; remapping at least one of the first and second PIDs so that the unencrypted packets and the decrypted packets have the same PID; and decoding the unencrypted and decrypted packets to produce a decoded video signal.

25. A computer readable tangible electronic storage device storing instructions which, when executed on a programmed processor, carry out the method of decoding and decrypting a digital video signal according to claim 24.

26. A computer readable tangible electronic storage device that carries instructions that when executed on a programmed processor facilitates operation of a video receiver device to decrypt and decode a selectively encoded digital video signal wherein the instructions comprise:

a code segment that controls a demultiplexer that receives packets of digital video, certain of the packets being unencrypted and certain of the packets being encrypted, wherein certain of the encrypted packets represent at least one of a pattern of horizontal stripes across an image and packets representing a pattern of vertical stripes across the image;

the unencrypted packets having a first packet identifier (PID) and the encrypted packets having a second packet identifier (PID);

a code segment that controls decryption of the encrypted packets to produce decrypted packets;

a code segment that controls remapping at least one of the first and second PIDs so that the unencrypted packets and the decrypted packets have the same BID; and a code segment that controls decoding the unencrypted and decrypted packets to produce a decoded video signal.

* * * * *